United States Patent [19]

Shevakin et al.

[11] 4,400,605

[45] Aug. 23, 1983

[54] METHOD OF PRODUCING WELDED THIN-WALL STRAIGHT-SEAMED TUBES

[75] Inventors: Jury F. Shevakin; Fikrat Seidaliev; Vladimir M. Tjushevsky; Jury V. Krasovsky; Erika D. Glebova; Valery K. Chivikin, all of Moscow, U.S.S.R.

[73] Assignees: Gosudarstvenny Nauchnoissledovatelsky; Proektny I Konstruktorsky Institut Splavov I Obrabotki Tsvetnyky Metallov "Giprotsvetmetobrabotka", both of U.S.S.R.

[21] Appl. No.: 318,971

[22] Filed: Nov. 6, 1981

[51] Int. Cl.³ .................... B23K 9/02; B23K 31/06
[52] U.S. Cl. .......................................... 219/61
[58] Field of Search .............................. 219/61, 75

[56] References Cited

U.S. PATENT DOCUMENTS 2,716,691  8/1955  Bowman ..................... 219/61
3,131,284  4/1964  Gibson ........................ 219/61

*Primary Examiner*—B. A. Reynolds
*Assistant Examiner*—Catherine Sigda
*Attorney, Agent, or Firm*—Steinberg & Raskin

[57] ABSTRACT

A method of producing welded, thin-wall straight-seamed tubes comprises forming a strip in rolls of a tube-forming mill into a tube skelp, and then subjecting the latter to the inert-gas-shielded non-consumable electrode welding. The tube skelp is formed with a gap between edges being 1/500 to 1/30 to the tube-diameter-to-wall-thickness ratio, taken in mm. The rate of welding and the level of welding current are selected in accordance with the rate of heat release in the welding zone, which should be sufficient to close joint due to heat expansion of the tube skelp material and the formation of welding joint.

3 Claims, No Drawings

METHOD OF PRODUCING WELDED THIN-WALL STRAIGHT-SEAMED TUBES

FIELD OF THE INVENTION

The present invention relates to the manufacture of welded thin-wall tubes, and more particularly, to a method of producing straight-seamed tubes, for example, by means of the argon-arc welding technique. This method is readily applicable to the manufacture of tubes from various metals and alloys, intended for numerous applications in heat and power engineering, radio engineering, electronics, instrument making and other branches of industry.

BACKGROUND OF THE INVENTION

The currently used technique for producing thin-wall tubes is rather complicated and labour consuming. It requires a great amount of raw materials and, in addition, fails to ensure high quality in combination with good plastic and strength properties of welded tubes.

For example, there is a known method of producing welded thin-wall straight-seamed tubes, which includes forming a strip into a tube skelp in the rolls of a tube-forming mill, and subsequent welding of this tube skelp by different methods.

In order to ensure the formation of a sound joint weld and to prevent the formation of a gap before the electrode due to the metal springing action, the edges of the formed tube are brought in contact and then subjected to upsetting pressure (see, for example, a book by Yu. M. Matveev, entitled "Theoretical Fundamentals for Production of Welded Tubes", Metallurgia Pulbishers, Moscow, 1967, pp.87–88, 102, 107–110, 120, etc.). With the decrease in the wall thickness of the tube being welded the profile rigidity, and compressive stresses act to bring about deformation of edges, such as swelling, their relative displacement, overlapping, etc. As a result, the quality of the welding joint is impaired by burnings-through, lack of fusion and other defects, which ultimately deteriorate strength properties of joint welds. To avoid the displacement of edges and to assure good quality of joint welds, the manufacture precision and high accuracy in setting the machine-tool attachments of a tube-welding mill are the necessary prerequisites for this. In addition, more stringent requirements are imposed on the skelp width allowances, as well as on the cutting quality and the surface cleanliness of the strip edges.

Various methods are used for welding the tubular skelp edges. For example, a high-frequency welding allows the operating process to be carried out at a considerable rate (up to 120 m/min and over). However, the high-frequency welding is disadvantageous in that it permits a burr 0.5 to 3 mm in thickness to be formed on the tube inner surface, the removal of which requires additional mechanical operations. Because of the difficulty to install an inside burr peeling device within a tube and to remove the burr remainders and metal shavings therefrom, the high-frequency welding method appears to be suitable for the production of tubes with a diameter of not more than 32 mm and a wall thickness not less than 2 mm.

There is also a known method of argon-arc welding a formed skelp, which is suitable for manufacturing tubes with a diameter less than 32 mm and a wall thickness less than 32 mm and a wall thickness less than 2 mm. In this case it is necessary to remove inside burr from the tube, as the local thickening formed in the weld on the tube inner surface is negligible and has the form of a shelf with clean unoxidized surface. However, the efficiency of the argon-arc welding method is rather low. The welding rate is only 0.3–0.5 m/min where steel tubes are produced, and 1–1.6 m/min where tubes from nonferrous metals are handled; the welding amperage does not exceed 30–45 A (see, for example, a book by D. A. Dudko, V. G. Verbitsky, B. I. Shnaider et al, entitled "Welding of Superthin Tubes", Mashinostroenie Publishers, 1977, p.38). The argon-arc welding makes it impossible to step up the operating rate because of the danger to disrupt the butt-type jointing and joining of edges. Furthermore, the quality of a joint weld is materially impaired and the number of defects grow. Thus burnings-through are due to occur in tubes along with poor intefusion and gas pores in the weld area.

Various welding techniques, such as pulse, plasma and microplasma arc welding, as well as other rather complicated welding processes have been recently brought in use to melt-off the edges of a formed tube skelp (see, for example, a book by D. A. Dudko, V. G. Verbitsky, B. I. Shnaider et al., entitled "Welding of Superthin Tubes", Mashinostroenie Publishers, 1977, pp. 34–39). However, all these methods necessitate thorough preparation of a tube skelp, with more stringent requirements imposed on its width size limits. In addition, the joining of edges becomes more difficult to enable a uniform butt-type joint whereas the welding rate and process efficiency remain unchanged.

It is an object of the present invention to enhance the process efficiency in the production of welded, thin-wall straight-seamed tubes.

Another object of the invention is to improve the quality of a joint weld.

These and other objects of the invention are accomplished by the provision of a method for producing welded thin-wall straight-seamed tubes, comprising forming a strip in rolls of a tube-forming mill, and subsequent inert-gas-shielded non-consumable electrode welding, wherein, according to the invention, the tube skelp is formed with a gap between edges being 1/500 to 1/30 of the tube-diameter-to-wall-thickness ratio, taken in mm, and wherein the welding rate and the welding amperage are selected such as to ensure the release of heat in the welding zone in an amount sufficient to enable the gap between the edges to be closed due to heat expansion of the tube skelp material and the formation of a joint weld.

Where brass welded thin-wall straight-seamed tubes are to be produced, the welding process is preferably carried out at the rate of 8 to 20 m/min and at the amperage of 80 to 250 A.

For the diameter of the welding arc spot to cover possible displacements of the tube skelp edges, the diameter of the non-consumable electrode is preferably selected to be 1/50 to 1/10 of the tube-diameter-to-wall-thickness ratio, taken in mm.

The method according to the invention for producing welded, thin-wall straight-seamed tubes is characterized by a high process efficiency and makes it possible to improve the quality of a joint weld.

The invention will now be described and exemplified as follows.

A tube skelp is formed from a strip in rolls of a tube-forming mill with a gap between the edges being 1/500 to 1/30 of the tube-diameter-to-wall-thickness ratio, taken in mm.

The tube skelp is then subjected to the inert-gas-shielded non-consumable electrode welding. The rate of welding and the welding amperage are selected such as to ensure the heat release in the welding zone to be sufficient to close the gap between the edges due to heat expansion of the tube skelp material and the formation of a weld joint.

The size of the gap between the edges is governed by the width and thickness of an initial strip, as well as by the material and the welding rate. A minimum size of this gap is determined by the necessity to preclude the possibility of overlapping of edges and their displacement relative to the tube axis. A maximum size of the gap is governed by the necessity to ensure close joint of edges due to heat expansion of the tube skelp material in the welding zone.

As the tube skelp is heated by a welding arc, it increases in perimeter due to heat expansion, and its edges are closed in the welding zone and brought it contact at the moment of their melting with the resultant formation of an arc weld pool.

The gap between the edges of a tube skelp serves to save these edges from being compressed by the rolls of a tube-forming mill, thereby assuring stable position of a thin-wall tube skelp and unhindered welding process, which otherwise may cause burnings-through and impaired quality of a weld joint. In addition, the provision of the gap makes it possible to use an initial strip of less strict size accuracy (in width) and permits a higher rate of welding.

The rate of welding is selected in accordance with the material and sizes of a tube skelp, whereby the gap between the edges is closed at the moment of heat expansion to ensure good quality of a joint weld. Where thin-wall tubes are to be manufactured from brass, the welding process is carried out at the rate of 8 to 20 m/min. With the welding rate less than 8 m/min, the gases dissolved in a molten metal will coagulate to form blow holes which weaken the strength of a joint weld. With the welding rate selected in the range from 8 to 20 m/min, a weld is formed to have no blow holes of any noticeable size and the joint weld turns out to be in no way inferior to the base metal of a tube. An increase in the welding rate above 20 m/min will lead to lack of fusion and weld undercuttings, the defects impairing the quality of a joint weld.

The quality of a joint weld also depends on the welding amperage. It should be high enough to permit the release of heat in an amount sufficient to enable the closing of edges due to heat expansion, and the melting of edges necessary for the formation of a sound joint weld. In the production of thin-wall brass tubes, the welding amperage is selected to be in the range of from 80 to 250 A. If the welding process is affected at the rate of 8 m/min, the welding amperage should not be less than 80 A, since otherwise it may cause lack of fusion. With the welding rate of 20 m/min and the amperage of more than 250 A, burnings-through and undercuttings are due to appear in a joint weld, which will be weaker in strength than the base metal of a tube.

The invention will now be described by the following illustrative Examples.

EXAMPLE 1

A brass (Cu 68, Zn 32) strip was formed into a tube skelp with a gap of 0.5 mm, this being 1/60 of the tube diameter (D) to wall thickness (t) ratio. Further, the formed tube (D=15 mm, t=0.5 mm) was welded by a tungsten electrode 3 mm in diameter, this being 1/10 of (D/t), the welding was carried out at the rate of 12 m/min and the amperage of 140 A.

EXAMPLE 2

A brass (Cu 68, Zn 37) strip was formed into a tube skelp with a gap of 0.04 mm, this being 1/500 of (D/t). The welding was carried out by a tungsten electrode 1.5 mm in diameter, which is 1/13 of (D/t), at the rate of 18 m/min and the amperage of 80 A. The finished welded tube had 6 mm in diameter and 0.30 mm in wall thickness.

EXAMPLE 3

A brass (Cu 70, Zn 30) strip was formed into a tube skelp with a gap of 1.67 mm, this being 1/30 of (D/t). The tube 40 mm in diameter and 0.8 mm in thickness was welded with the aid of a tungsten electrode 4.5 mm in diameter, this being 1/11 of D/t, at the rate of 20 m/min and the amperage of 250 A.

EXAMPLE 4

A brass (Cu 85, Zn 15) strip was formed into a tube skelp with a gap of 0.3 mm, this being 1/66 of (D/t). The welding was carried out by a tungsten electrode 2 mm in diameter, which is 1/10 of (D/t), at the rate of 8 m/min and the amperage of 80 A. The finished tube had 10 mm in diameter and 0.5 mm in thickness.

EXAMPLE 5

A brass (Cu 63, Zn 37) strip was formed into a tube skelp with a gap of 1.8 mm, this being 1/83 of (D/t). The tube 45 mm in diameter and 0.3 mm in thickness was welded by a tungsten electrode 3 mm in diameter, this being 1/50 of (D/t), at the rate of 10 m/min and the amperage of 120 A.

The dimensional accuracy of the rolls of a tube-forming mill employed for carrying out the method of the invention as illustrated above was within the limits normally accepted in conventional tube-welding mills.

In all the above-described examples use was made of a soft etched brass strip produced commercially and requiring no special treatment.

The tubes produced as described in Examples 1–5 have revealed high quality welds without any burnings-through or lack of fusion.

From the above it follows that the method of the invention makes it possible to enhance the welding efficiency and improve the quality of a joint weld.

What we claim is:

1. A method of producing welded thin-wall straight-seamed tubes, comprising forming a strip in the rolls of a tube-forming mill into a tube skelp with a gap between edges being 1/500 to 1/30 of the tube-diameter-to-wall-thickness ratio, taken in mm; subjecting the said tube skelp to the inert-gas-shielded non-consumable electrode welding; the rate of welding and the welding amperage being selected such as to ensure the release of heat in the welding zone in an amount sufficient to enable the gap between the edges to be closed due to the heat expansion and the formation of a joint weld.

2. A method of producing brass thin-wall tubes as set forth in claim 1, wherein the welding is carried out at the rate of 8 to 20 m/min and at the amperage of 80 to 250 A.

3. A method of producing welded thin-wall tubes as set forth in claim 2, wherein the diameter of the said non-consumable electrode is 1/50 to 1/10 of the tube-diameter-to-wall-thickness ratio, taken in mm.

* * * * *